United States Patent
Miyata

(10) Patent No.: US 8,730,497 B2
(45) Date of Patent: May 20, 2014

(54) PRINT JOB MANAGEMENT APPARATUS, PRINT JOB MANAGEMENT METHOD, AND STORAGE MEDIUM FOR GENERATING PRINT JOB TO BE TRANSMITTED ACCORDING TO ACCEPTED PRINT INSTRUCTION

(75) Inventor: Junichi Miyata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 12/689,565

(22) Filed: Jan. 19, 2010

(65) Prior Publication Data

US 2010/0182645 A1   Jul. 22, 2010

(30) Foreign Application Priority Data

Jan. 21, 2009   (JP) ................................. 2009-011320

(51) Int. Cl.
   *G06F 3/12*   (2006.01)
(52) U.S. Cl.
   USPC ............................. 358/1.15; 358/1.14; 726/28
(58) Field of Classification Search
   None
   See application file for complete search history.

(56) References Cited

U.S. PATENT DOCUMENTS

| 2005/0114267 A1* | 5/2005 | Miwa et al. ..................... 705/59 |
| 2005/0254070 A1* | 11/2005 | Sayama ......................... 358/1.1 |
| 2008/0115207 A1* | 5/2008 | Go ................................. 726/17 |
| 2009/0009802 A1* | 1/2009 | Shaw et al. .................. 358/1.15 |

FOREIGN PATENT DOCUMENTS

JP    2006-285784 A    10/2006

* cited by examiner

*Primary Examiner* — Firmin Backer
*Assistant Examiner* — Nicholas Pachol
(74) *Attorney, Agent, or Firm* — Canon USA Inc IP Division

(57) ABSTRACT

A print job management apparatus which generates a print job to be transmitted to a printing apparatus according to an accepted print instruction includes a job interpretation unit configured to determine whether an operator processing the print job generated according to the print instruction is designated in the print instruction, a logon management unit configured to confirm a logon state of the printing apparatus if the job interpretation unit determines that the operator is not designated, a job generation unit configured to generate the print job, and a transmission control unit configured to transmit the print job generated by the job generation unit to the printing apparatus, wherein the transmission control unit waits to transmit the print job if the logon management unit determines that the printing apparatus is in a logoff state and transmits the print job to the printing apparatus if the logon management unit determines that the printing apparatus is in a logon state.

6 Claims, 20 Drawing Sheets

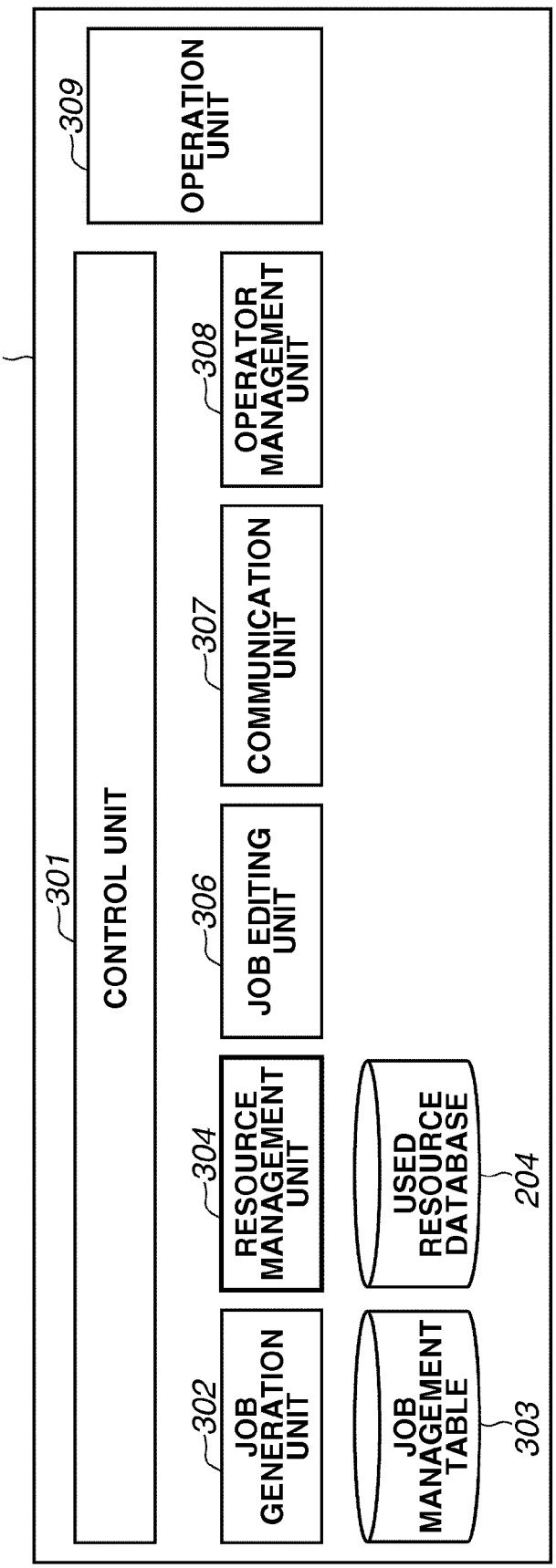

FIG.5B

| OPERATOR SETTING |
|---|

☑ REQUEST FOR OPERATOR REPORT ～507
  ○ DESIGNATE OPERATOR: NO
  ⊙ DESIGNATE OPERATOR: YES ～508

| Person A |
| Person B |
| Person C |
| Person D |

509

[OPERATOR REGISTRATION] [OK] [CANCEL]

FIG.9A

| JOB SETTING (JOB TICKET) (OVERALL, PREPRESS, PRESS, AND POSTPRESS SETTING) | ~901 |
| --- | --- |
| JOB CONTENT (PDF) | ~902 |

FIG.9B

| | SETTING ITEM | SETTING VALUE | |
| --- | --- | --- | --- |
| 907 | JOB OWNER | ARBITRARY | 903 OVERALL JOB SETTING |
| 908 | REQUEST FOR OPERATOR REPORT | YES | |
| | ... | ... | |
| 909 | IMPOSITION | 2 in 1 | 904 PREPRESS SETTING |
| | ... | ... | |
| 910 | PAPER-FEED STAGE | TRAY 1 | 905 PRESS SETTING |
| | ... | ... | |
| 911 | FINISHING | STAPLE | 906 POSTPRESS SETTING |
| | ... | | |

FIG.10A

| | SETTING ITEM | SETTING VALUE |
|---|---|---|
| 1001 | JOB ID | ID1234 |
| 1002 | JOB OWNER | NONE |
| 1003 | REQUEST FOR OPERATOR REPORT | NONE |
| | ... | ... |
| 1004 | IMPOSITION | 2 in 1 |
| | ... | ... |
| | ... | ... |
| | ... | |

FIG.10B

| | SETTING ITEM | SETTING VALUE |
|---|---|---|
| 1005 | JOB ID | ID1234 |
| 1006 | JOB OWNER | ARBITRARY |
| 1007 | REQUEST FOR OPERATOR REPORT | YES |
| | ... | ... |
| | ... | ... |
| 1008 | PAPER-FEED STAGE | TRAY 1 |
| | ... | ... |
| 1009 | FINISHING | STAPLE |
| | ... | |

FIG.10C

| | SETTING ITEM | SETTING VALUE |
|---|---|---|
| | JOB ID | ID1234 |
| 1010 | JOB OWNER | PersonA |
| 1011 | REQUEST FOR OPERATOR REPORT | YES |
| | ... | ... |
| | ... | ... |
| | PAPER-FEED STAGE | TRAY 1 |
| | ... | ... |
| | FINISHING | STAPLE |
| | ... | |

| | | |
|---|---|---|
| 1102 | JOB ID | ID1234 |
| 1103 | OPERATOR IN CHARGE | |
| 1104 | NUMBER OF MONOCHROMATIC PAGES OUTPUT | |
| 1105 | NUMBER OF COLOR PAGES OUTPUT | ... |
| 1106 | OPERATION HISTORY TABLE | |

| | TIME AND DATE | OPERATION RECORD | |
|---|---|---|---|
| 1107 | | | 1108 |
| 1109 | 2008/01/01 12:00 | PRINTING START | |
| 1110 | 2008/01/01 12:01 | ERROR (NO PAPER) | |
| 1111 | 2008/01/01 12:02 | RECOVERED | |
| 1112 | 2008/01/01 12:03 | PRINTING COMPLETED | |

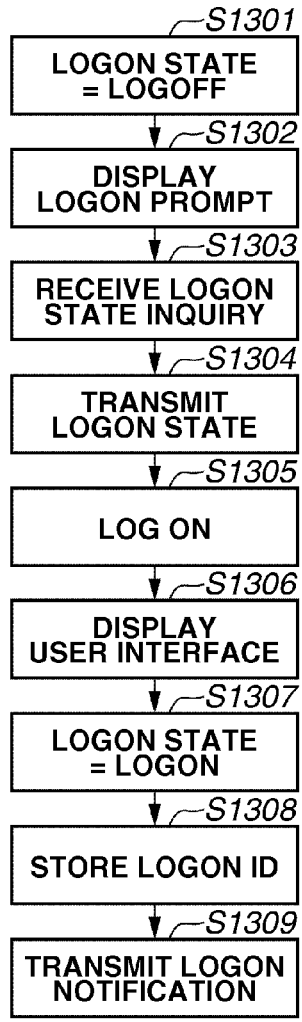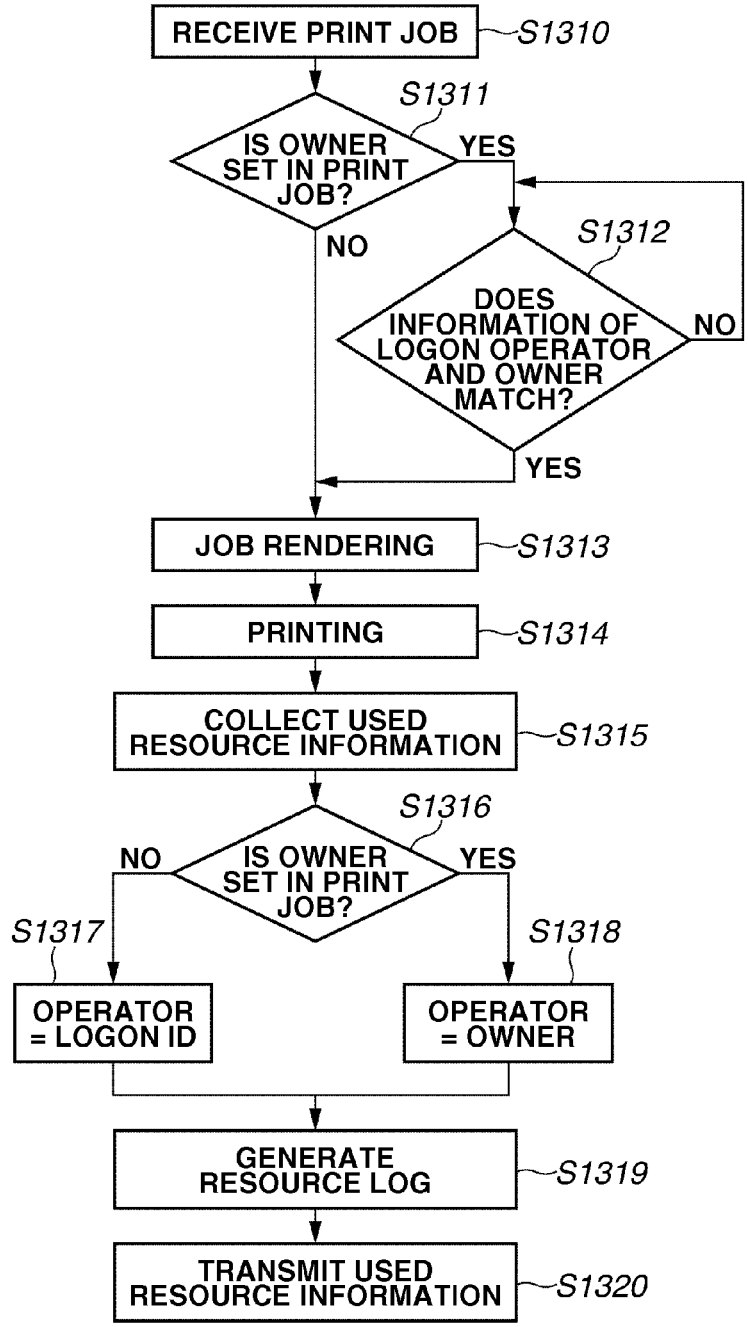

FIG.16A

| LOGON STATE | LOGON ID | LOGON TIME |
|---|---|---|
| | | |

| LOGON STATE | LOGON ID | LOGON TIME |
|---|---|---|
| LOGOFF | | |

| LOGON STATE | LOGON ID | LOGON TIME |
|---|---|---|
| LOGON | PersonA | 2008/01/01 12:00 |

| JOB ID | ID1234 |
|---|---|
| OPERATOR IN CHARGE | PersonA |
| NUMBER OF MONOCHROMATIC PAGES OUTPUT | 15 |
| NUMBER OF COLOR PAGES OUTPUT | 0 |
| OPERATION HISTORY TABLE | |

FIG.17B

| TIME AND DATE | OPERATION RECORD |
|---|---|
| 2008/01/01 12:00 | PRINTING START |
| 2008/01/01 12:01 | ERROR (NO PAPER) |
| 2008/01/01 12:02 | RECOVERED |
| 2008/01/01 12:03 | PRINTING COMPLETED |

PRINT JOB MANAGEMENT APPARATUS, PRINT JOB MANAGEMENT METHOD, AND STORAGE MEDIUM FOR GENERATING PRINT JOB TO BE TRANSMITTED ACCORDING TO ACCEPTED PRINT INSTRUCTION

BACKGROUND OF THE INVENTION

1. Field of the Invention

The present invention relates to a job management apparatus and a job management method of a digital printing system used for transmitting print data to a digital printing apparatus and printing the transmitted data.

2. Description of the Related Art

In a commercial printing industry, where payment from a third person is made by accepting an order of creation of a print product (such as a magazine, a newspaper, a brochure, an advertisement, or a photogravure) from the third person (a customer or a client), creating the print product desired by the third person, and delivering it to the third person, there is mainly used a large scale printing apparatus such as an offset reproduction printing machine. In the commercial printing industry, printing operation is performed via various processes.

The processes include document receiving, designing, layout, comprehensive layout (presentation by printer output), proofing (layout correction or color correction), proof printing, artwork creation, printing, post-processing, and delivery. An artwork is necessary in using the printing machine described above.

Once the artwork is made, it is not easy to change it and high cost is required if it is to be corrected. This is because, careful proofing, in other words, careful layout checking and color confirmation is essential in changing the artwork. As described above, in the commercial printing industry, a large scale apparatus and a certain degree of time have been required to create a print product desired by a client.

Meanwhile, according to development of electrophotography printing apparatuses and ink jet printing apparatuses that perform printing at a higher speed with a higher quality, a type of printing business called Print On Demand (POD) is increasing its market share.

According to the POD services, content of a job of a printing apparatus is divided into a relatively small lot size. Accordingly, print processing can be performed in a shorter period without using a large scale apparatus or system. The POD systems maximize utilization of digital copying machines and digital image forming apparatuses of digital multifunctional peripherals in place of the above-described large scale printing machines and printing methods and produce digital prints using electronic data.

In the POD market, in recent years, a system that supports business plan and management work by collecting information about resources that are used in producing output product by using infrastructure of POD, in other words, digital input/output environment, has been discussed. In such a system, information about resources which are used when the output product is produced is necessary. Thus, actual data of operators (human resources), or consumables (material resources) needs to be collected. However, an optimum system capable for collecting data of operators (human resources) who are actually involved in the printing operation is not realized yet.

For example, Japanese Patent Application Laid-Open No. 2006-285784 discusses a technique concerning an operation management of operators in a POD system such as the one described above. According to this operation management, optimum scheduling of the operators and devices (printing apparatuses) is performed according to an acceptance order of the print products. For example, in an operation system such as the POD system where operations (manual operations) of a plurality of devices are performed parallely, both the schedules of the operators (work shifts) and the print job schedules assigned to the devices are optimized. Thus, when a print job is accepted, optimum scheduling of the operator and digital multifunction peripheral (MFP) can be realized.

According to the technique discussed in Japanese Patent Application Laid-Open No. 2006-285784, the operator needs to be defined in advance since the scheduling of the operator has to be performed in advance. However, according to the technique discussed in Japanese Patent Application Laid-Open No. 2006-285784, if a print job whose operator is not defined is accepted, even if the print job is appropriately scheduled, the printing may be performed with the operator undetermined. In such a case, if an operator corrected an error or processed the print product in the print job whose operator is not defined, the operator cannot be determined. Accordingly, operation result of each operator cannot be accurately managed.

SUMMARY OF THE INVENTION

According to an aspect of the present invention, a print job management apparatus which generates a print job to be transmitted to a printing apparatus according to an accepted print instruction includes a job interpretation unit configured to determine whether an operator processing the print job generated according to the print instruction is designated in the print instruction, a logon management unit configured to confirm a logon state of the printing apparatus if the job interpretation unit determines that the operator is not designated, a job generation unit configured to generate the print job, and a transmission control unit configured to transmit the print job generated by the job generation unit to the printing apparatus, wherein the transmission control unit waits to transmit the print job if the logon management unit determines that the printing apparatus is in a logoff state and transmits the print job to the printing apparatus if the logon management unit determines that the printing apparatus is in a logon state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a software block diagram illustrating a module configuration of a resource management application.

FIGS. 5A and 5B illustrates examples of a user interface displayed on a display unit of an operation unit of a resource management unit.

FIGS. 9A and 9B are conceptual illustrations of a structure of a prepress job and a print job according to an exemplary embodiment of the present invention.

FIGS. 10A, 10B, and 10C are concrete examples of a job setting (job ticket).

FIGS. 11A and 11B illustrate a table structure of used resource information.

FIGS. 13A and 13B are flowcharts illustrating processing of the digital MFP when it receives a print job from the print job management application.

FIGS. 16A, 16B and 16C illustrate a table structure of a logon information database.

FIGS. 17A and 17B illustrate table structures of the used resource information transmitted from the print job management application to the resource management application.

DESCRIPTION OF THE EMBODIMENTS

Various exemplary embodiments, features, and aspects of the invention will be described in detail below with reference to the drawings.

Figure 1:
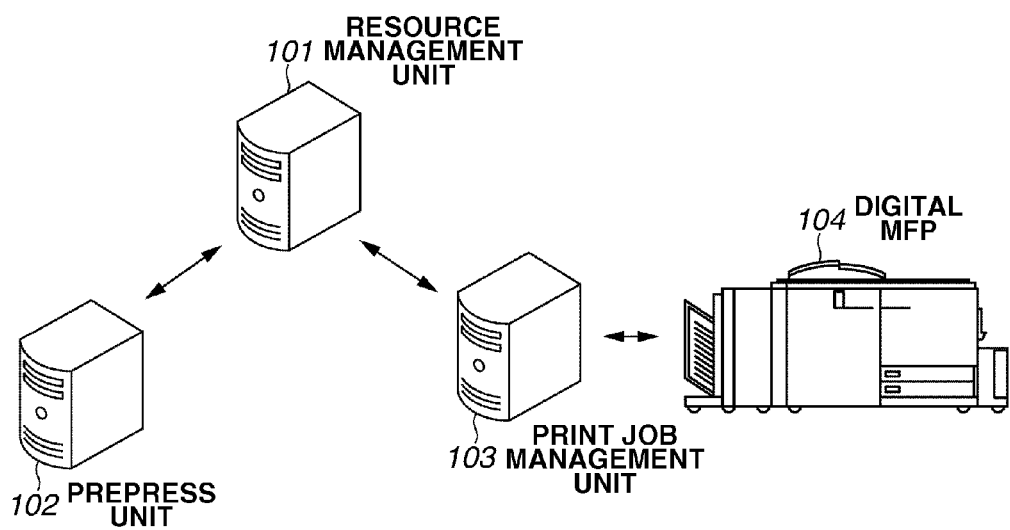
FIG. 1 illustrates a configuration of a print processing system of a printing system including a print job management apparatus according to the present invention.

FIG. 1 illustrates a configuration of a print processing system of an entire printing system including a print job management apparatus according to a first exemplary embodiment of the present invention.

The print processing system includes a resource management unit 101, a prepress unit 102, and a print job management unit 103, each of which is configured by a computer. The print processing system also includes a digital MFP 104 as a digital printing apparatus. The digital MFP 104 includes a digital printing unit as a main apparatus, and further includes a plurality of functions such as scanner and facsimile functions. The resource management unit 101 can be connected to a management unit serving as an upper system so that the management unit can collectively manage data.

The resource management unit 101 issues a print job which is described in detail below. Based on a job ticket of the print job, used resources (e.g., a number of used sheets and operators) are managed. The prepress unit 102 performs prepress processing such as imposition processing of a job according to an instruction from the resource management unit 101.

According to an instruction from the resource management unit 101, the print job management unit 103 receives a print job 207 which is a print job generated after the prepress processing. After editing the print job 207, the print job management unit 103 transmits a print job 208 to the digital MFP 104 and also manages the job. Since a print job management application generates the print job 208 for the digital MFP 104 when the print job management unit 103 receives the print job 207, the print job 207 is also referred to as a print instruction.

The print job and a prepress job described below are jobs including a job ticket. A job ticket is a ticket for storing various pieces of information necessary in processing and setting a print operation.

Figure 2:
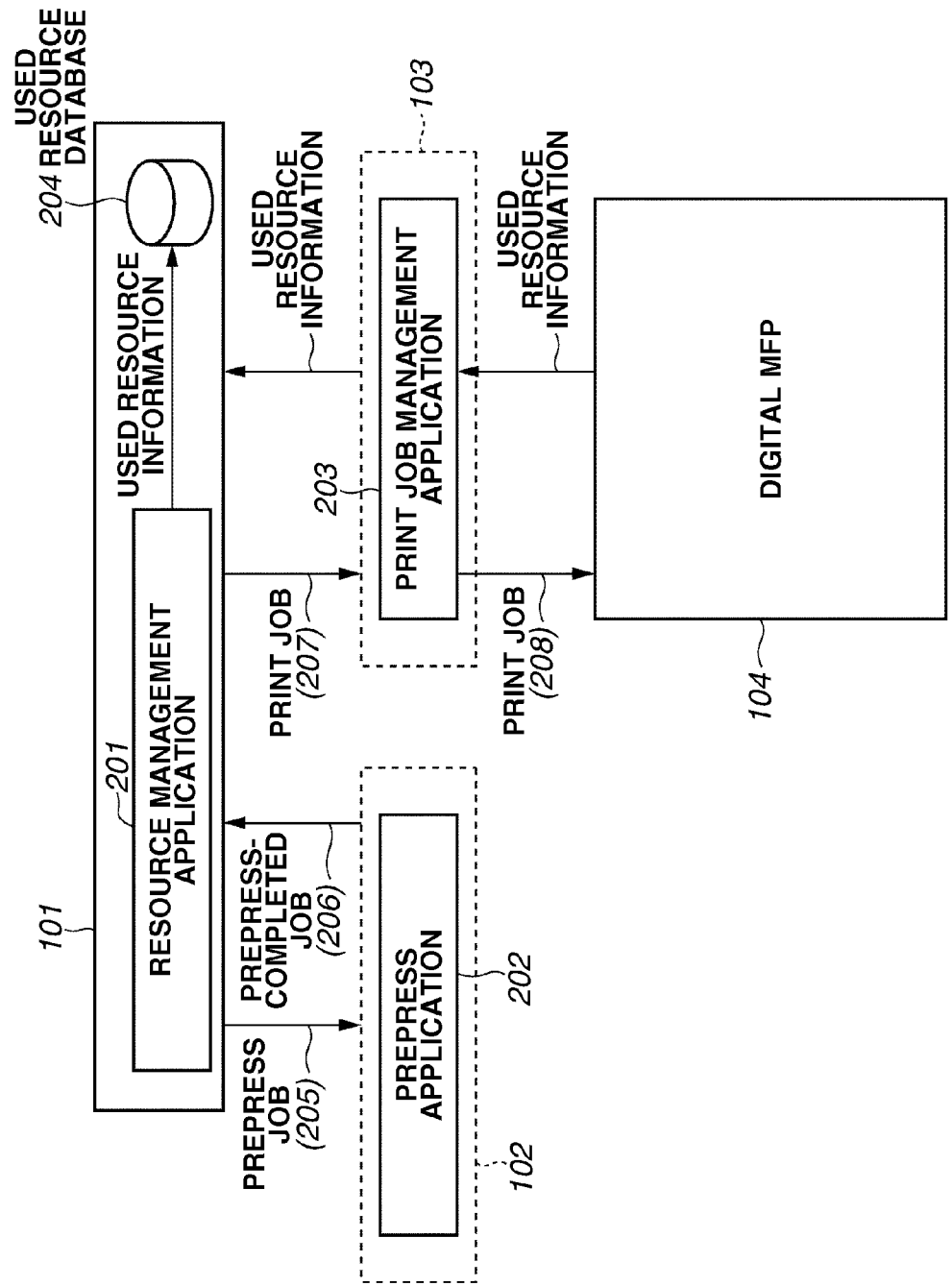
FIG. 2 is a block diagram illustrating a software configuration of the printing system illustrated in FIG. 1.

FIG. 2 is a block diagram illustrating a software configuration of the printing system illustrated in FIG. 1.

As illustrated in FIG. 2, a resource management application 201 runs on the resource management unit 101. The resource management application 201 manages transmission of the prepress job, reception of a prepress-completed job and generation, editing, and transmission of the print job. Further, the resource management application 201 manages used resource information and operator information. As described below, the operator information is used as an authentication key when the operator logs on the digital MFP 104.

A prepress application 202 runs on the prepress unit 102. The prepress application 202 performs pre-printing processing such as imposition processing of a prepress job 205 transmitted from the resource management application 201. The imposition printing includes, for example, two-sided printing in which imposition of print data is performed on both sides of a sheet and imposition of a plurality of pieces of the print data is performed on one side of a sheet (e.g., 2 in 1 printing). The 2 in 1 printing is used for arranging two pieces of print data on one side of a sheet.

A print job management application 203 runs on the print job management unit 103. The print job management unit 103 receives the print job 207 from the resource management application 201 and, after analyzing it, it transmits the print job 208 to the digital MFP 104.

Next, referring to FIG. 2, the flow of jobs between the applications will be described.

The resource management application 201 transmits the prepress job 205 including a job ticket to the prepress application 202. The job ticket includes a prepress instruction of the imposition processing. The prepress application 202 performs the prepress imposition processing of the prepress job 205 and transmits a prepress-completed job 206 to the resource management application 201. Upon receiving the prepress-completed job 206, the resource management application 201 transmits the job to the print job management application 203 as the print job 207.

When the print job management application 203 receives the print job 207, it transmits the print job 208 which is generated according to the setting of the job ticket of the print job 207, to the digital MFP 104.

The digital MFP 104 analyzes the print job 208 transmitted from the print job management application 203 and performs printing. When the printing is completed, the digital MFP 104 transmits information about the resources used by the printing to the print job management application 203. The information about such resources is, for example, information about used printing paper, ink, or toner (hereinafter referred to as used resource information). The print job management application 203 transmits the used resource information to the resource management application 201. The resource management application 201 that received the used resource information adds the used resource information to a used resource database 204.

FIG. 3 is a software block diagram illustrating a module configuration of the resource management application 201. Although not shown, each module is operated according to a central processing unit (CPU) of an information processing apparatus which includes the resource management application 201, reading out a computer-executable program of the resource management application 201 from a memory and executing it. As illustrated in FIG. 3, the resource management application 201 includes a control unit 301, a job generation unit 302, a job management table 303, and a resource management unit 304. The job generation unit 302, the job management table 303, and the resource management unit 304 are controlled by the control unit 301. The resource management application 201 further includes the used resource database 204, a job editing unit 306, a communication unit 307, an operator management unit 308, and an operation unit 309.

The job generation unit 302 generates the prepress job 205 which is transmitted to the prepress application 202. The job management table 303 stores management information such as progress and a status of the generated prepress job 205. The used resource database 204 stores the used resource information. The resource management unit 304 manages the used resource information included in the job tickets of the print jobs 207 and 208.

The job editing unit 306 edits settings included in the job ticket of the print job 207 transmitted to the print job management application 203. The communication unit 307 communicates with the prepress application 202 or the print job management application 203. The operator management unit 308 performs management of operators, as described below. The operation unit 309 displays a user interface which is used for setting an operator or setting for collecting information relating to the operator as described below.

Figure 4A:
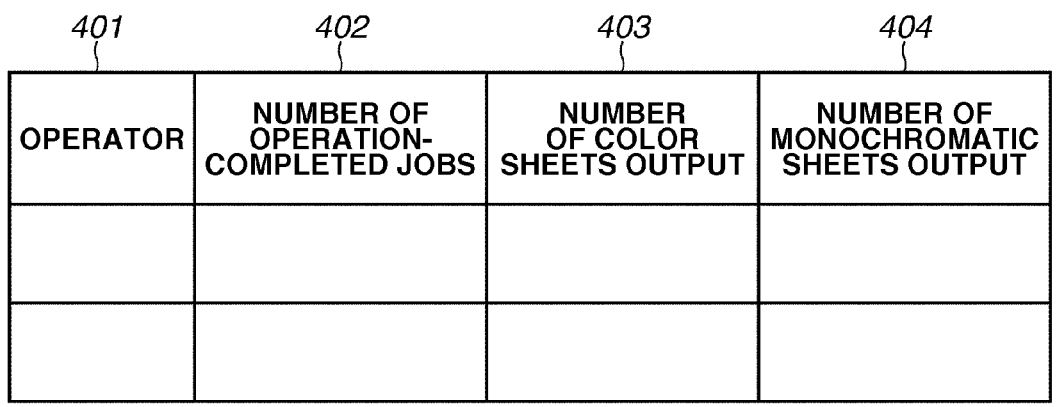
FIGS. 4A and 4B illustrate examples of a table structure of a used resource database.

FIG. 4A illustrates an example of a table structure of the used resource database 204. The used resource database 204 includes a storage field 401 where an operator name or a user ID is stored, a storage field 402 where a number of operation-completed jobs is stored, a storage field 403 where a number of color sheet outputs is stored, and a storage field 404 where a number of monochromatic sheet outputs is stored.

The print job management application 203 stores an operator name or a user ID assigned to the operator in advance in the storage field 401 and stores a number of operation-completed jobs in the storage field 402. Further, the print job management application 203 stores a number of color sheets that is output by the operator using the digital MFP 104 in the storage field 403, and similarly, a number of monochromatic sheets that is output in the storage field 404.

Figure 4B:
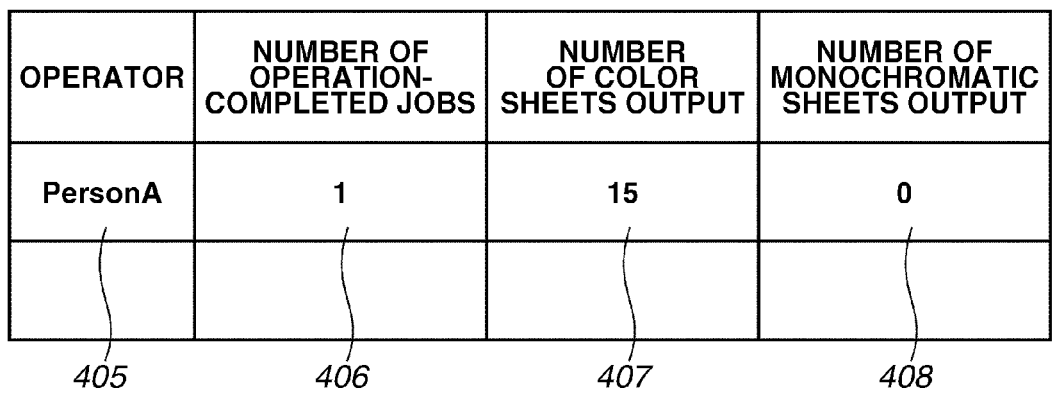

FIG. 4B illustrates an example in which an operator name or a user ID, a number of operation-completed jobs, a number of color sheet outputs, and a number of monochromatic sheet outputs are stored in the respective fields of the table illustrated in FIG. 4A. According to the example illustrated in FIG. 4B, "Person A" is stored in a storage field 405 of the operator and "1" is stored in a storage field 406 of the number of the operation-completed jobs. Further, "15" is stored in a storage field 407 of the number of the color sheet outputs and "0" is stored in a storage field 408 of the number of the monochromatic sheet outputs. By referring to this table, it is understood that "Person A" performed 1 print job including output of 15 color sheets but no monochromatic sheets.

Figure 5A:
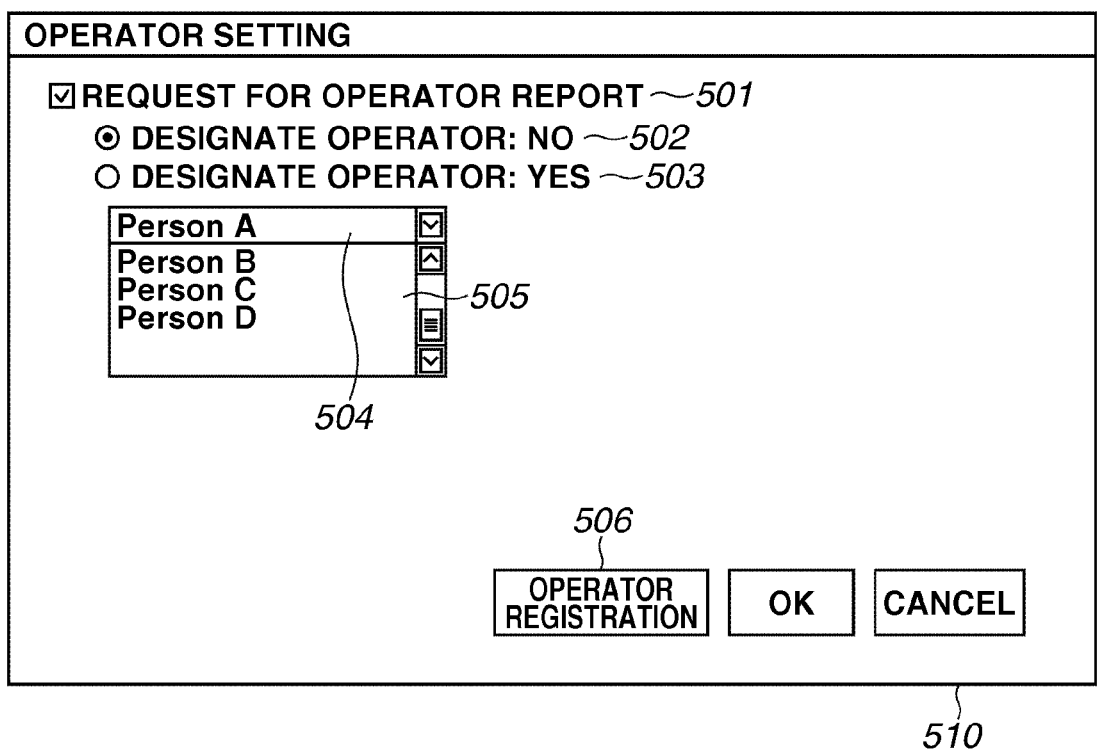

FIGS. 5A and 5B illustrate examples of a user interface displayed on a display unit (e.g., liquid crystal display (LCD)) of the operation unit 309 of the resource management unit 101. As illustrated in FIG. 5A, a user interface unit 510 includes a check box 501, radio buttons 502 and 503, a dialog box 504, a list box 505 of operators, and an operator registration button 506.

The check box 501 is used for designating a request for transmission of operator information (i.e., operator name or user ID) from the resource management application 201 to the print job management application 203. By selecting the check box 501, a request for transmission of the operator information from the resource management application 201 to the print job management application 203 is enabled.

The radio buttons 502 and 503 are used for operator designation. The radio buttons 502 and 503 are enabled when the check box 501 is selected. The radio button 502 is selected if the designation of the operator is not necessary. The radio button 503 is selected if the operator is to be designated. A case where the check box 501 is not selected is described below.

The list box 505 of operators is used for displaying names or user IDs of operators managed by the operator management unit 308. According to this example, the operator names or the user IDs are scrolled by the scroll button. The dialog box 504 displays a name or a user ID of an operator (user) selected from the list box 505. The operator registration button 506 is used for displaying a user interface (not shown) for adding a new operator to the list box 505 on the display unit of the operation unit 309. Further, an application that manages the operators can add an operator to the list box 505 by using this user interface.

Figure 6:
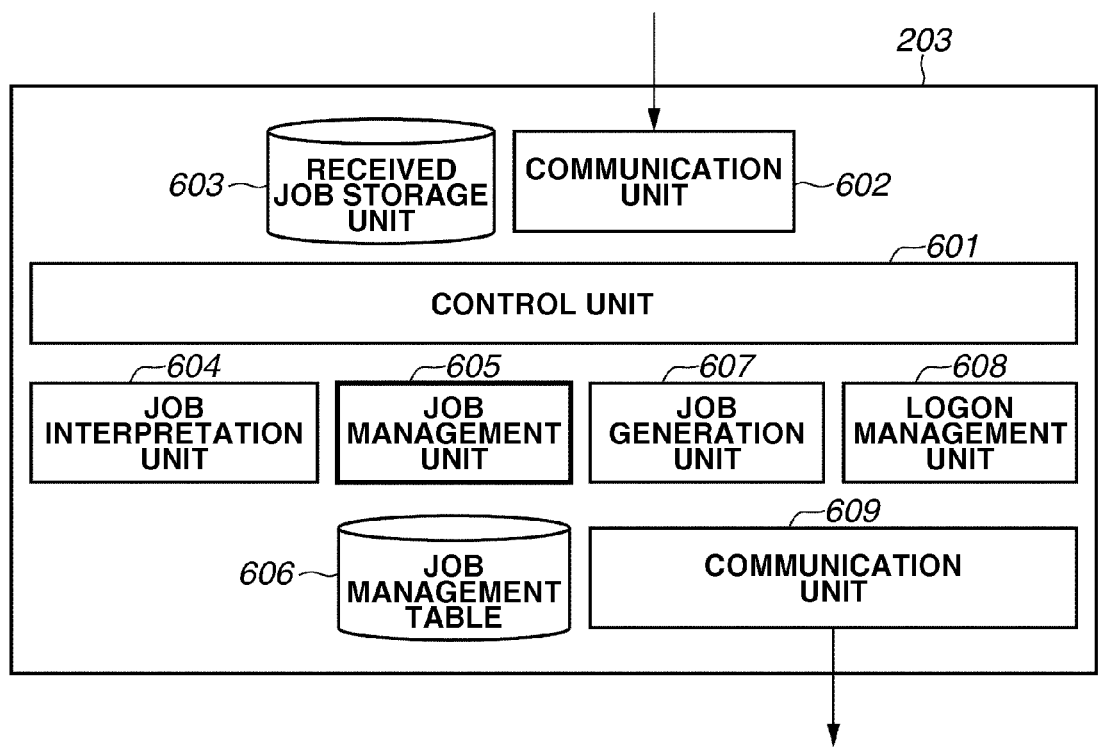
FIG. 6 is a software block diagram illustrating an example of a component configuration of a print job management application illustrated in FIG. 2.

FIG. 6 is a software block diagram illustrating an example of a component configuration of the print job management application 203 illustrated in FIG. 2. Although not shown, each module is operated according to a CPU of the information processing apparatus which includes the print job management application 203, reading out a computer-executable program of the print job management application 203 from a memory and executing it. Each component of the print job management application 203 realizes the control and operation illustrated in FIG. 15 under the control of a control unit 601.

As illustrated in FIG. 6, the print job management application 203 includes a first communication unit 602, a received job storage unit 603, and a job interpretation (analysis) unit 604. The print job management application 203 further includes a job management unit 605, a job management table 606, a job generation unit 607, a logon management (authentication) unit 608, and a second communication unit 609.

The first communication unit 602 communicates with the resource management application 201. The received job storage unit 603 temporarily stores the print job 207 transmitted from the resource management application 201. The job interpretation (analysis) unit 604 analyzes the print data included in the print job 207 which is transmitted from the resource management application 201 to the first communication unit 602. The job interpretation unit also analyzes information and setting information included in the job ticket of the print job 207.

The job management unit 605 stores and manages the print job 207 interpreted by the job interpretation unit 604. The job management table 606 stores and manages a list of the print job 207 managed by the job management unit 605. The job generation unit 607 edits data or a setting of the job ticket of the print job 207 received by the first communication unit 602 as needed. Then, the job generation unit 607 generates the print job 208 which is transmitted to the digital MFP 104.

The logon management unit 608 manages a logon state of the operator, namely logon and non-logon (logoff) of the operator, in the digital MFP 104. The second communication unit 609 communicates with the digital MFP 104.

Figure 7:
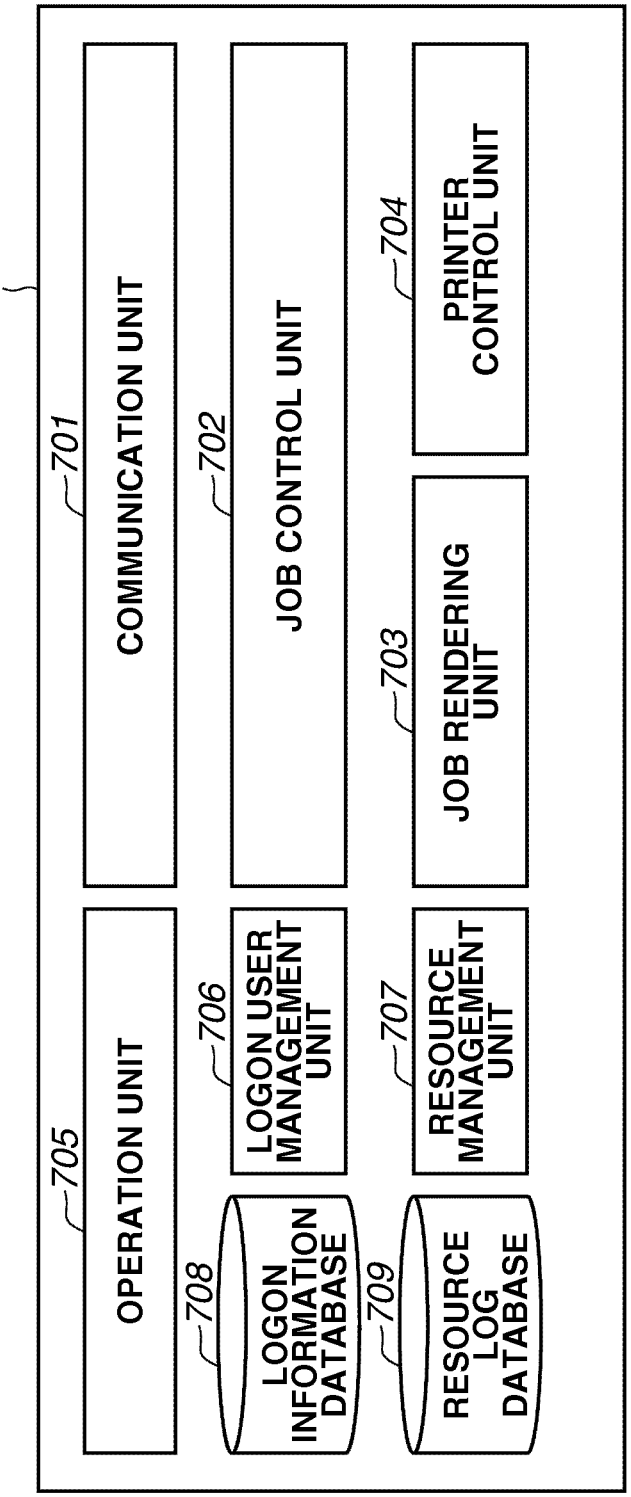
FIG. 7 is a software block diagram illustrating a configuration example of a digital MFP.

FIG. 7 is a software block diagram of a configuration example of the digital MFP 104. Although not shown, each module is operated according to a CPU of the digital MFP 104 reading out a computer-executable program from a memory and executing it. The digital MFP 104 includes a communication unit 701, a job control unit 702, a job rendering unit 703, and a printer control unit 704. The digital MFP 104 further includes an operation unit 705, a logon user management unit 706, a resource management unit 707, a logon information database 708, and a resource log database 709.

The operation unit 705 displays on a display unit of the digital MFP 104 a user interface which enables the operator to perform setting or operating of the digital MFP 104. The user interface is described below referring to FIGS. 8A and 8B.

The communication unit 701 receives the print job 207 (208) which the print job management application 203 received. The job rendering unit 703 performs rendering processing (bitmap processing of a page) of the print data included in the print job 208 under the control of the job control unit 702. The printer control unit 704 controls a printing unit and a paper feed unit (both of them are not shown) based on apparatus control information included in the job ticket of the print job 208. Accordingly a print product is output as a final product.

The logon user management unit 706 manages information about the logon user (operator) who logged on to the digital MFP 104 from the operation unit 705. In other words, the logon user management unit 706 manages operator information including an operator name or a user ID as well as information about contents of the operation performed by the operator. As described below, the resource management unit 707 stores the operator information, resource information about the consumables used in the digital MFP 104, and information about the human resources indicating a name or a user ID of the operator who performed the printing operation to the resource log database 709 and manages them.

FIGS. 16A to 16C illustrate tables of the logon information database 708. FIG. 16A illustrates a configuration of the table. FIG. 16B illustrates the table in a logoff state. FIG. 16C illustrates the table in a logon state.

The table of the logon information database 708 includes a storage field 1601 where a logon state is stored, a storage field 1602 where a logon ID is stored, and a storage field 1603 where a logon time is stored. In the table of the logon information database 708, information about whether the operator is logged on to or logged out from the digital MFP 104 is stored in the storage field 1601 and the name or the user ID of the operator who performs the printing operation is also stored Further, a logon ID is stored in the storage field 1602 and a logon time is stored in the storage field 1603. The "logon ID" corresponds to the name or the user ID of the operator that performs the printing operation. Accordingly, a search using search keys such as the "logon state", "logon ID", and "logon time" becomes available. According to the search, the person who logged on to the digital MFP 104 and the time that person logged on can be determined.

Figure 8A:
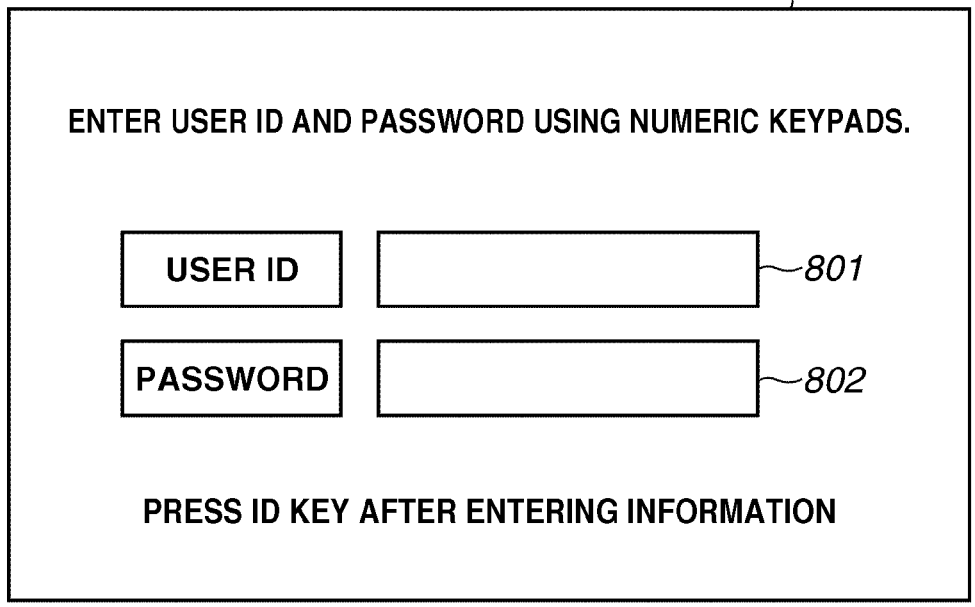
FIGS. 8A and 8B illustrate examples of a user interface displayed on a display unit of an operation unit of the digital MFP.
Figure 8B:
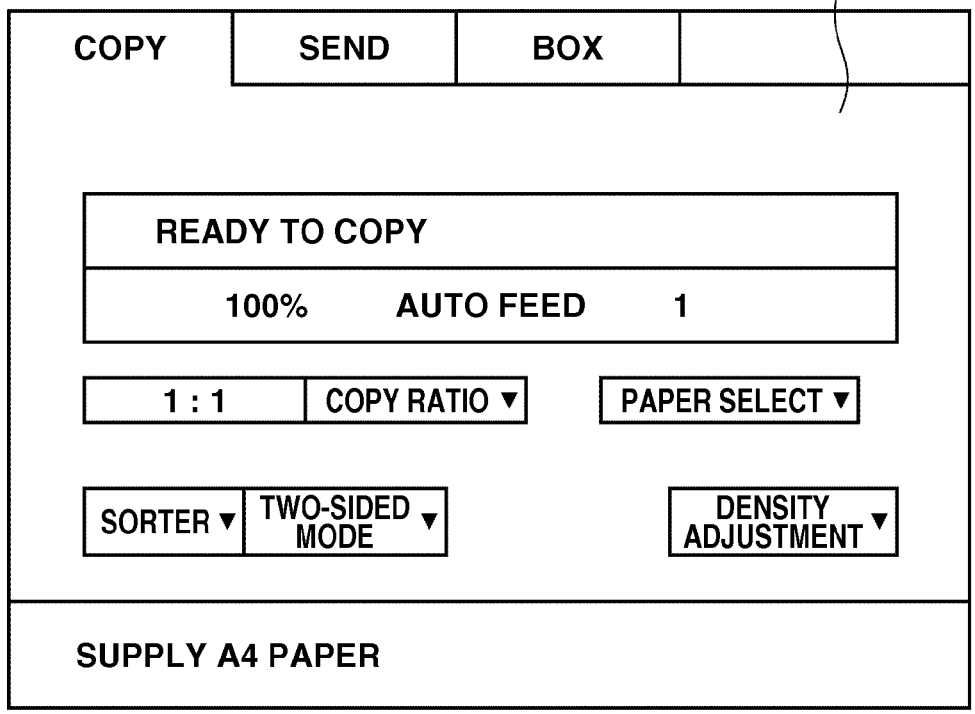

FIGS. 8A and 8B are examples of the user interface displayed on the display unit of the digital MFP 104 when an operator operates the operation unit 705 of the digital MFP 104. FIG. 8A is an example of the user interface which is displayed when the operator logs on. FIG. 8B is an example of the user interface which is displayed after the operator has logged on.

As illustrated in FIG. 8A, a user interface 803 includes a user ID input field 801 and a password input field 802. The operator can enter a user ID and a password in the input fields 801 and 802 by using an input device, such as a numeric keypad (not shown) of the operation unit 705. If an operator, who is the logon user, enters a user ID, for example, "Person A" in the user ID input field 801, enters a password in the password input field 802, and selects an ID key (not shown) of the user interface 803. Then, the logon management unit 608 of the print job management application 203 refers to the logon information database 708 to determine whether "Person A" and the password are included in information which is registered beforehand.

If the user ID and the password of "Person A" that are entered match the registered information, the logon management unit (authentication unit) 608 permits the logon of the operator and displays a user interface 804 illustrated in FIG. 8B on the display unit of the operation unit 705. After then, the operator operates the digital MFP 104 using the user interface 804 and performs the printing operation.

The user interface 804 includes, for example, "copy", "send", and "box". Their functions, settings and operation methods differ according to specifications. According to the example illustrated in FIG. 8B, regarding the user interface "copy", functions for determining sorter on/off, imposition setting, density setting, and print paper selection are provided.

FIGS. 9A and 9B are conceptual illustrations of structures of the prepress job 205, the prepress-completed job 206, the print jobs 207 and 208 (see FIG. 2) according to the present exemplary embodiment.

Although the prepress job 205, the prepress-completed job 206, the print jobs 207 and 208 have different format structures, since they are logically similar, the jobs are described as having a same structure. Further, the present exemplary embodiment does not depend on the format structures and transfer protocols of the prepress job 205, the prepress-completed job 206, and the print jobs 207 and 208.

FIG. 9A illustrates an overall structure of the prepress job 205, the prepress-completed job 206, and the print jobs 207 and 208. As illustrated in FIG. 9A, each of the jobs includes a job setting (job ticket) 901 and job content 902.

The job ticket includes information about "overall setting", "prepress setting", "press setting", and "postpress setting". The job content 902 is page rendering data to be printed in a page description language such as portable document format (PDF) (registered mark).

FIG. 9B illustrates a structure of the job setting (job ticket) 901. The job setting 901 includes an overall job setting 903, a prepress setting 904, a press setting 905, or a postpress setting 906. The overall job setting 903 includes job owner information 907 and an operator report request 908. The prepress setting 904 includes an imposition setting 909. The press setting 905 includes a paper-feed stage setting 910 for setting a tray such as a tray 1 or 2. The postpress setting 906 includes a finishing setting 911.

The job owner information 907 determines the owner of the job. The operator report request 908 serves as a flag for determining whether the application that processes the job setting is to transmit the operator information. The imposition setting 909 is used for issuing an instruction so that imposition processing of rendering data, which is the job content 902, is performed. According to the imposition processing, 2 in 1 printing, in which two pages of the rendering data are arranged on one sheet of print paper, and two-sided printing can be performed. The paper-feed stage setting 910 is used for selecting a tray from which the paper used for printing is fed. The finishing setting 911 is used for designating a post-processing setting such as staple processing for fastening the printed sheets with staples.

FIGS. 10A to 10C illustrate concrete examples of the job setting (job ticket) 901 described referring to FIGS. 9A and 9B. FIG. 10A illustrates the job setting 901 of the prepress job 205 transmitted from the resource management application 201 to the prepress application 202.

Although a job ID 1001 is set to "ID 1234" in FIG. 10A, any ID may be used so long as it is a unique ID. Further, since the prepress application 202 automatically performs prepress processing such as imposition processing, an operator is not necessary. Thus, a job owner 1002 and an operator report request 1003 are set to "none". A prepress imposition setting 1004 is set to "2 in 1". Further, the press and the postpress settings are not set in FIG. 10A. This is because the press and the postpress settings are not required in the prepress processing. Accordingly, the prepress application 202 performs "2 in 1" imposition processing of the job content 902.

FIGS. 10B and 10C are concrete examples of the job ticket of the print job 207 transmitted from the resource management application 201 to the print job management application 203. According to the example in FIG. 10B, "ID 1234" which is the ID same as the job ID used for the prepress application 202 is set to job ID 1005. Accordingly, after the print job 207 is transmitted from the resource management application 201 to the prepress application 202, it is transmitted further to the print job management application 203 via the resource management application 201. Thus, a series of processing is established.

In FIG. 10B, "arbitrary" is set to a job owner 1006. This means that an arbitrary user can processes the print job illustrated in FIG. 10B. By setting "Yes" to an operator report request 1007, the print job management application 203 transmits operator information about the operator who performed the printing, namely the name or the user ID of the operator, to the resource management application 201.

Additionally, "tray 1" is set to a paper-feed stage 1008. This means that paper is fed from the tray 1 when the printing is performed. Further, "staple" is set for finishing 1009. This means that the print product output from the digital MFP 104 is stapled.

FIG. 10C also illustrates a print job transmitted from the resource management application 201 to the print job management application 203. The difference between FIG. 10C and FIG. 10B is that "Person A" is set to a job owner 1010. This means that the user ID of the user that processes the print job in FIG. 10C is "Person A". In other words, the user who can process the print job is determined in FIG. 10C.

Further, "Yes" is set to an operator report request 1011. According to this setting, it is understood that information about the operator of the printing operation is to be transmitted to the resource management application 201. Furthermore, the job content 902 of the print job transmitted from the resource management application 201 to the print job management application 203 is a prepress-processing completed content, which has been processed by the prepress application 202. In other words, the content is imposition-completed content.

FIG. 11A illustrates a table structure of the used resource information transmitted from the print job management application 203 to the resource management application 201.

In a job ID storage field 1102 in a used resource information table 1101, a job ID corresponding to the used resource information is stored. In a storage field 1103, the name or the user ID of an operator in charge who performed the operation is stored. In a storage field 1104, a number of monochromatic pages that are output according to the print job determined by the job ID storage field 1102 is stored. Similarly, in a storage field 1105, a number of color pages that are output according to the print job determined by the job ID storage field 1102 is stored. In a storage field 1106, an operation history table is stored.

FIG. 11B illustrates a concrete example of the operation history table. As illustrated in FIG. 11B, cells under a "time and date" column 1107 include information about time and date of the operation. Cells under an "operation record" column 1108 include an operation record. In each of rows 1109 to 1112, date and time and an operation record such as a type of error that occurred and recovery processing performed to recover the error.

According to the example in FIG. 11B, "printing start", "error (out of paper)", "recovery", and "printing end" are stored in the cells of the operation records in the rows 1109, 1110, 1111, and 1112 as resource information regarding the printing operation performed by the operator. Further, the time and date of each operation is stored in the left cell of each of the above-described rows. FIG. 11B illustrates a case where the printing has been started at 12:00 on Jan. 1, 2008, the out of paper error has occurred at 12:01, the error has been recovered at 12:02, and the printing ended at 12:03.

Figure 12A:
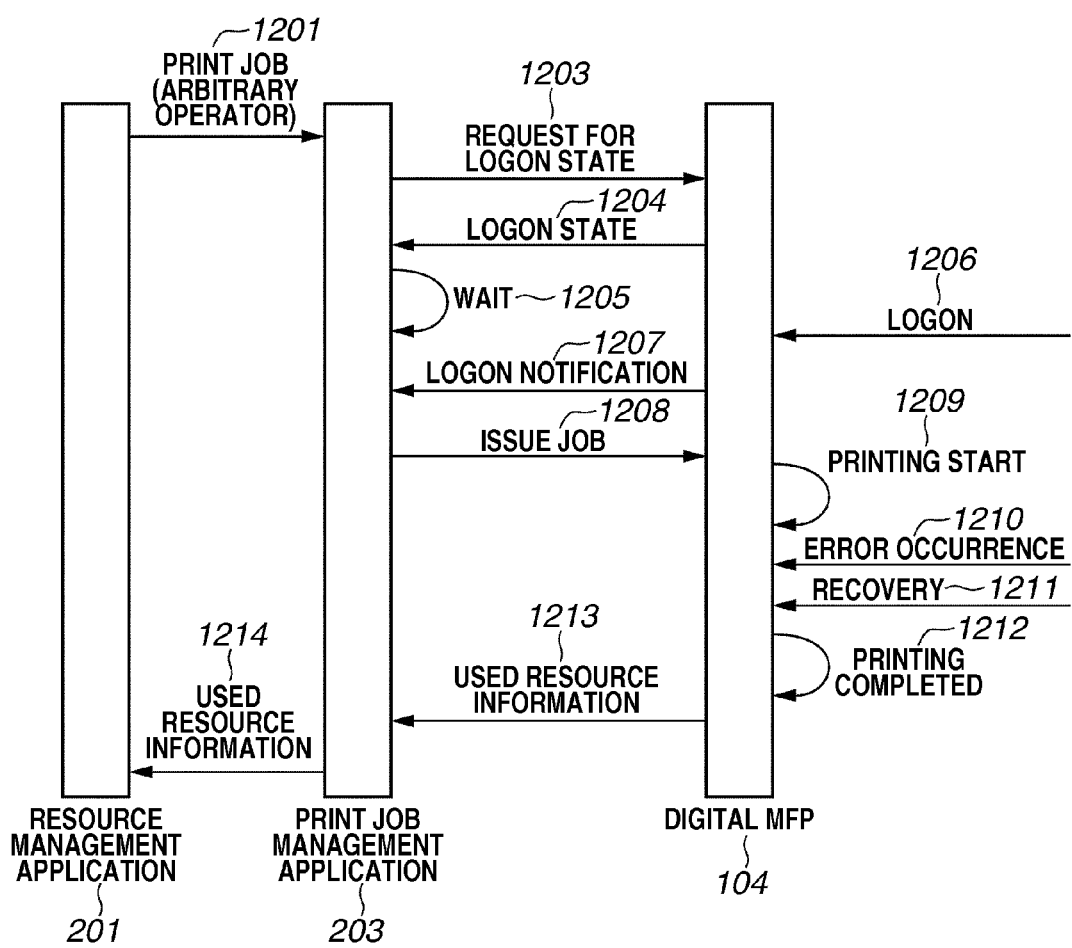
FIGS. 12A and 12B are sequence diagrams illustrating settings of the resource management application.
Figure 12B:
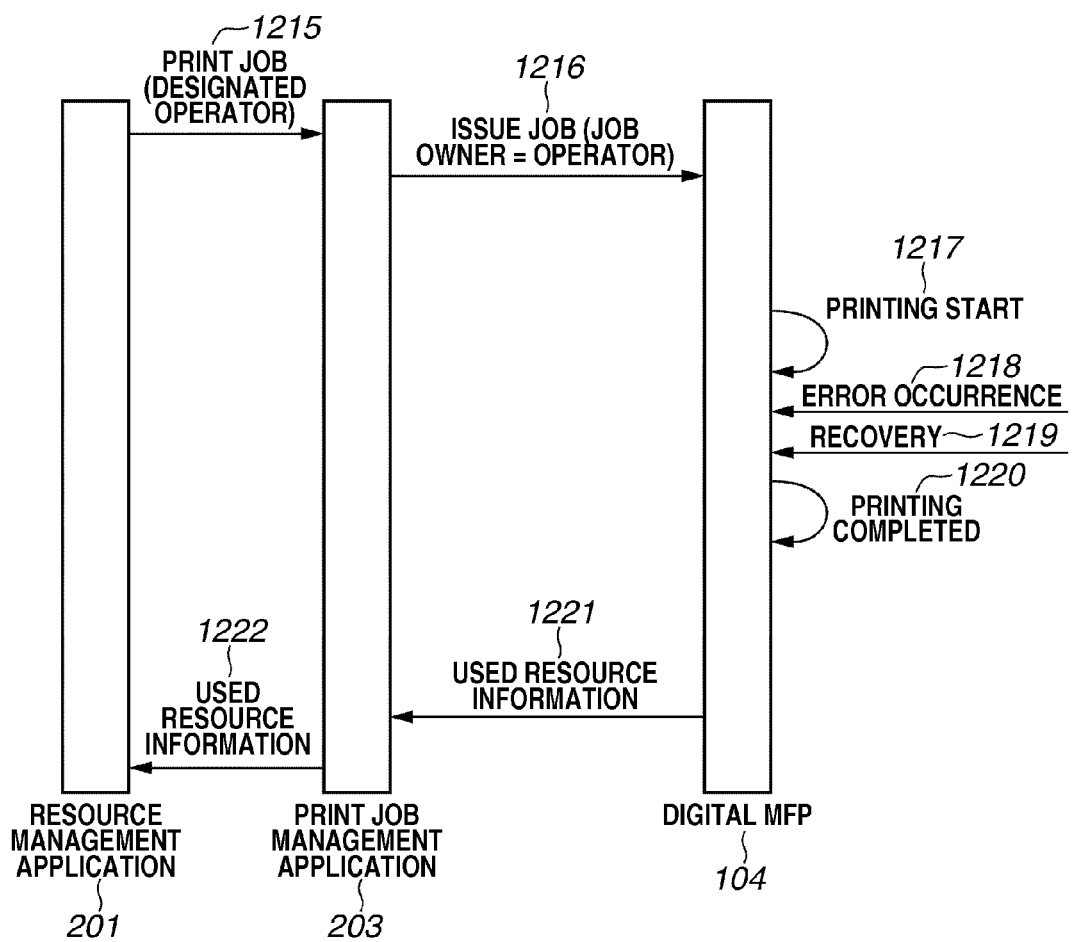

FIGS. 12A and 12B are sequence diagrams among the resource management application 201, the print job management application 203, and the digital MFP 104 illustrated in FIG. 2.

FIG. 12A illustrates a case where the check box 501 and the radio button 502 are selected and the operator of the print job 207 is set as arbitrary regarding the setting of the resource management application 201 (see FIGS. 5A and 5B).

As illustrated in FIG. 12A, the resource management application 201 transmits the print job 207 including the job owner information 1006 set to "arbitrary" and the operator report request 1007 set to "Yes" as illustrated in FIG. 10B to the print job management application 203 (1201).

When the print job 207 is received, the print job management application 203 transmits an inquiry signal for inquiring the logon state to the digital MFP 104 (1203). According to the inquiry signal, the user interface 803 illustrated in FIG. 8A is displayed on the operation unit 705 of the digital MFP 104. Further, at this time, since the user is not logged on to the digital MFP 104, the digital MFP 104 returns a message to the print job management application 203 that it is in a "logoff" state (1204).

The print job management application 203 waits to issue the print job 208 to the digital MFP 104 until the operator logs on the digital MFP 104 (1205). When the operator logs on from the operation unit 705 of the digital MFP 104 using a password and a user ID, the logon user management unit 706 authenticates the operator and the logon is completed (1206). Then, the digital MFP 104 issues a logon notification to the print job management application 203 (1207).

When the print job management application 203 receives the logon notification, it issues the print job 208 to the digital MFP 104 (1208). On receiving the print job 208, the digital MFP 104 starts printing (1209). Further, from the data output from the digital MFP 104, the print job management application 203 acquires data concerning printing, for example, error data, recovery data, and consumables data (printing paper, ink, or toner).

If an error occurs in the digital MFP 104 (1210), the operator of the printing operation performs recovery processing of the error that occurred (1211). When the digital MFP 104 is recovered, it starts printing again. When the printing is completed (1212), the digital MFP 104 transmits the used resource information to the print job management application 203 (1213). The used resource information includes, as described above referring to FIG. 11, for example, the operator name or the user ID of the operator in charge of the printing operation, the number of monochromatic page outputs, the number of color page outputs, and the operation record generated according to the operation.

The print job management application 203 that transmits the received used resource information to the resource management application 201 (1214). Further, the error and recovery information and the information about the time and date of the error and the recovery will be stored in the used resource information table 1101 (see FIG. 11B).

FIG. 12B illustrates a case where the operator that performs the printing operation is designated regarding the setting of the resource management application 201. An operator is designated by the resource management application 201 of the resource management unit 101 which is another upper system. In this way, logon of an operator other than the designated operator is prohibited. This is effective in printing print products that include confidential information.

First, a check box 507 and a radio button 508 are selected on the user interface unit 510 illustrated in FIG. 5B. According to the setting, the resource management application 201 issues the print job 207 in which the operator report request 1011 is set to "Yes" and the job owner 1010 in the job ticket is set to "Person A" (1215).

Next, the print job management application 203 that received the print job 207 edits the job ticket and generates the print job 208 including the operator "Person A" as the job owner. Then, the print job management application 203 transmits the generated print job 208 to the digital MFP 104 (1216).

After then, the operator logs on using the password and the user ID corresponding to "Person A". The logon management unit 608 authenticates the user as described above. When the logon is permitted, the permitted operator can perform the printing operation.

After then, the digital MFP 104 starts the printing according to the operation setting set by the operator using the user interface 804 (1217).

If an error occurs during the printing operation (1218), the error is displayed on the display unit of the operation unit 705, and the digital MFP 104 automatically stops the printing operation. If the operator recovers the error of the digital MFP 104 (1219), the system automatically recovers.

Then, the printing is started again. When the printing is completed (1220), the digital MFP 104 transmits the used resource information to the print job management application 203 (1221). (See FIG. 11) The print job management application 203 transmits the used resource information to the resource management application 201 (1222). The resource management application 201 stores the used resource information and the information about the error, recovery, time and date of error occurrence, and time and date of recovery processing is performed of the printing operation, to the used resource database 204 and the resource log database 709.

FIG. 13A is a flowchart illustrating processing of the digital MFP 104 when the operator logs on. Each step of the flowchart in FIG. 13A is realized by the CPU of the digital MFP 104 reading out a computer-executable program related to the processing in FIG. 13A from the memory and executing it.

In step S1301, the logon user management unit 706 stores "logoff" in a logon state storage field 1604 of the logon information database 708 as illustrated in FIG. 16B if the digital MFP 104 is in a logoff state. In step S1302, the operation unit 705 displays a logon prompt on the operation screen of the display unit. Then, the user interface 803 illustrated in FIG. 8A is displayed on the display unit by the operation of the operator.

In step S1303, the digital MFP 104 receives an inquiry signal inquiring the logon state from the print job management application 203. In step S1304, since the operator is not logged on to the digital MFP 104 at this time, the digital MFP 104 transmits the logoff state to the print job management application 203.

In step S1305, if the digital MFP 104 accepts logon of the operator, the logon management unit 608 performs the authentication of the logon user. In step S1306, if the logon of the operator is authenticated, the operation unit 705 displays the user interface 804 illustrated in FIG. 8B on the display unit.

In step S1307, the logon user management unit 706 stores "logon" in a logon state storage field 1605 as illustrated in FIG. 16C. In step S1308, the logon user management unit 706 stores the user ID of the operator in a logon ID storage field 1606.

In step S1309, the logon user management unit 706 transmits the logon notification to the print job management application 203.

FIG. 13B is a flowchart illustrating the operation of the digital MFP 104 when it receives the print job 208 from the print job management application 203.

In step S1310, the communication unit 701 of the digital MFP 104 receives the print job 208 from the print job management application 203.

In step S1311, the resource management unit 707 reads the data in the job owner field in the job ticket of the print job 208 and determines whether an operator is set in the storage field of the job owner 1010.

If the resource management unit 707 determines that an operator is set in the job owner 1010 (YES in step S1311), then the process proceeds to step S1312. In step S1312, the resource management unit 707 determines whether the current logon operator of the digital MFP matches the operator that is set in the job owner 1010. Step S1312 is repeated until the operators match. Then, the process proceeds to step S1313.

In step S1313, the job rendering unit 703 performs the rendering processing (bitmap processing of the content) on the received print job 208. In step S1314, the printer control unit 704 internally controls the digital MFP 104 based on the apparatus control information designated in the job ticket of the print job 208 and executes printing. In step S1315, the resource management unit 707 collects information about the resources used in the processing in step S1314, more particularly, information about the number of the color pages or the number of the monochromatic pages that are printed.

In step S1316, the resource management unit 707 reads the data stored in the job owner field in the job ticket of the print job 208 and determines whether an operator is set in the field of the job owner 1010. If the operator name or the user ID thereof is set in the job owner field (YES in step S1316), the process proceeds to step S1318. In step S1318, the digital MFP 104 determines that the job owner is the operator, and the process proceeds to step S1319. In step S1319, the digital MFP 104 generates a resource log.

In step S1316, if data of the job owner is not set (i.e., "arbitrary" is set) in the storage field of the job owner 1010 (NO in step S1316), then the process proceeds to step S1317. In step S1317, the digital MFP 104 determines that the operator who has logged on from the operation unit 705 is the job owner, and the process proceeds to step S1319. In step S1319, the digital MFP 104 generates a resource log.

In step S1320, the digital MFP 104 stores the information about the human resources to the resource log database 709. Further, the resource log stored in the resource log database 709 is transmitted from the digital MFP 104 to the resource management application 201 via the print job management application 203. Thus, the resource log is stored in the used resource database 204 by the resource management application 201 as the used resource information.

Figure 14:
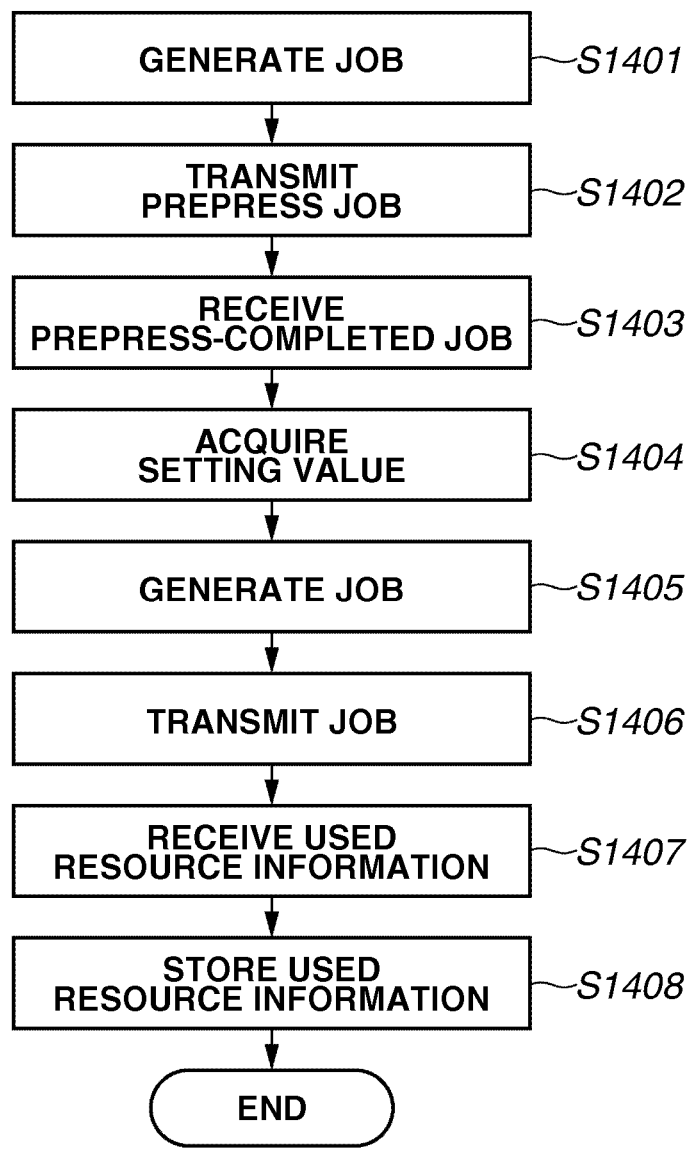
FIG. 14 is a flowchart illustrating an operation of the resource management application.

FIG. 14 is a flowchart illustrating an operation of the resource management application 201. Each step of the flowchart in FIG. 14 is realized by the CPU of the information processing apparatus which includes the resource management application 201, reading out a computer-executable program relating to the processes in FIG. 14 from the memory and executing it. Sequence management of the prepress job 205 is performed according to the job management table 303.

In step S1401, the job generation unit 302 of the resource management application 201 generates the prepress job 205. In step S1402, the generated prepress job 205 is transmitted to the prepress application 202. In step S1403, the communication unit 307 of the resource management application 201 receives the prepress-completed job 206 in which the imposition processing is performed by the prepress application 202.

In step S1404, the operator management unit 308 acquires setting values set by the user interface unit 510 illustrated in FIG. 5. The setting values include the one for whether the operator report is required and the one for the designation of the operator. In step S1405, the job editing unit 306 generates the print job 207 that reflects the setting values. In step S1406, the communication unit 307 of the resource management application 201 transmits the print job 207 to the print job management application 203. In step S1407, after the print processing is completed, the communication unit 307 receives the used resource information from the print job management application 203. In step S1408, the resource management unit 304 stores the used resource information in the used resource database 204.

Figure 15:
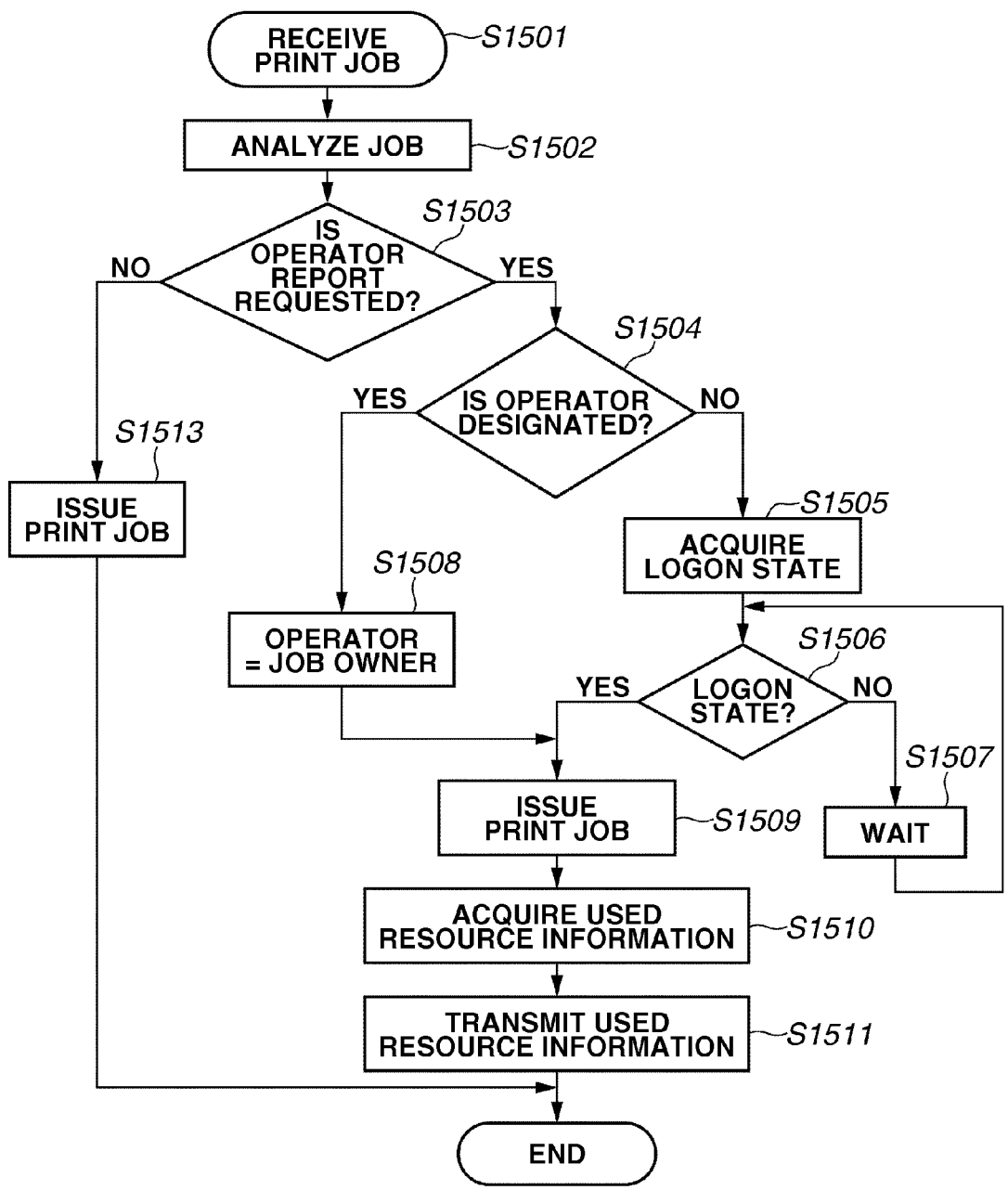
FIG. 15 is a flowchart illustrating an operation of the print job management application.

FIG. 15 is a flowchart illustrating an operation of the print job management application 203. Each step of the flowchart in FIG. 15 is realized by the CPU of the information processing apparatus which includes the print job management application 203, reading out a computer-executable program relating to the processes in FIG. 15 from the memory and executing it.

In step S1501, the print job management application 203 receives the print job 207 from the resource management application 201 via the first communication unit 602 and stores the print job 207 in the received job storage unit 603. In step S1502, the job interpretation unit 604 interprets the print job 207.

In step S1503, the job interpretation unit 604 reads the setting of the operator report request 908 in the job setting (job ticket) 901 illustrated in FIG. 9 and determines whether the operator report is requested. In step S1503, if the operator report is requested (YES in step S1503), the process proceeds to step S1504. In step S1504, the job interpretation unit 604 reads the setting of the job owner information 907 illustrated in FIG. 9 and determines whether the operator is designated.

In step S1504, as illustrated in FIG. 10B, if the setting of the job owner 1006 is "arbitrary", in other words, if the job owner is not designated (NO in step S1504), then the process proceeds to step S1505. In step S1505, the logon user management unit 706 acquires the current logon state of the digital MFP 104. In step S1506, the digital MFP 104 is determined whether its current state is "logon" or "logoff".

If the current state is determined as logoff (NO in step S1506), the process proceeds to step S1507. In step S1507, the control unit 601 waits for the print job to be issued. If the current state is determined as logon (YES in step S1506), then the process proceeds to step S1509. In step S1509, the job generation unit 607 issues the print job 208. The print job 208 which is issued via steps S1505 to S1507 includes information instructing transmission of the used resource information (processing information) in which the identification information about the user who is logged on to the digital MFP 104 when the print job 208 is processed is described as the information about the operator in charge.

Further, if the logon notification received in step 1207 in FIG. 12A includes information about the logon operator, the job generation unit 607 can issue the print job 208 including an instruction for transmitting the used resource information about the operator included in the logon notification. The control unit 601 may be referred to as a transmission control unit as it controls the transmission of the print job 208. In step S1510, when the printing operation is completed according to the operation of the digital MFP 104, the print job management application 203 acquires the used resource information. In step S1511, the used resource information is transmitted to the resource management application 201.

As a result of the determination in step S1504, if the operator of the printing operation is designated (YES in step S1504), then the process proceeds to step S1508. In step S1508, the job owner of the job ticket is determined as the operator of the printing operation, and the process proceeds to step S1509. In step S1509, the print job 208 is issued. Since the operator is designated in the print job 208 which is issued via step S1508, the above-described instruction information is not included in the print job 208.

After the print job 208 is issued, when the above-described printing performed by the digital MFP 104 is completed, in step S1510, the control unit 601 acquires the used resource information. In step S1511, the used resource information is transmitted to the resource management application 201.

According to the present exemplary embodiment, if the operator is not designated in the print job issued from the resource management application, the print job management application waits to issue the print job 208 until the operator logs on to a digital printer. Thus, the printing is not performed unless the operator is determined.

Further, since the print job 208 including the above-described instruction information is issued, even if a print job that does not designate the operator is issued from the resource management application 201, information about the operator who actually processed the print job can be obtained.

Conventionally, if a print job that does not designate the operator is issued from the resource management application 201, the printing is performed with the operator undetermined. Thus, it is not possible to determine the operator who corrected the error or the operator who handled the print product.

However, according to the present exemplary embodiment, for example, the print job management application 203 waits to issue the print job 208 until the operator logs on to the digital printer.

If an operator "Person B" logs on to the digital printer, the print job management application 203 issues the print job 208.

Then, contents of the processing of the print job 208 performed by the operator "Person B" is notified to the resource management application 201 as illustrated in FIG. 17A.

Thus, even if a print job that does not designate the operator is issued from the resource management application 201, it is possible to manage information indicating that the operator "Person B" corrected the error and handled the output print product.

As an example of the first exemplary embodiment, if information about the logon operator is included in the received logon notification, it is described above that the job generation unit 607 can issue the print job 208 including instruction information instructing to transmit the used resource information about the operator included in the logon notification.

For example, if an operator A is the logon operator, the print job 208 includes the instruction information instructing to transmit the used resource information about the operator A.

If the operator A logs out and, further, a different operator B logs on and processes the print job 208 before the digital MFP 104 receives the print job 208, then incorrect used resource information will be transmitted. In other words, although the operator B is the person who actually processed the job, the used resource information about the operator A is transmitted to the resource management application.

Figure 18:
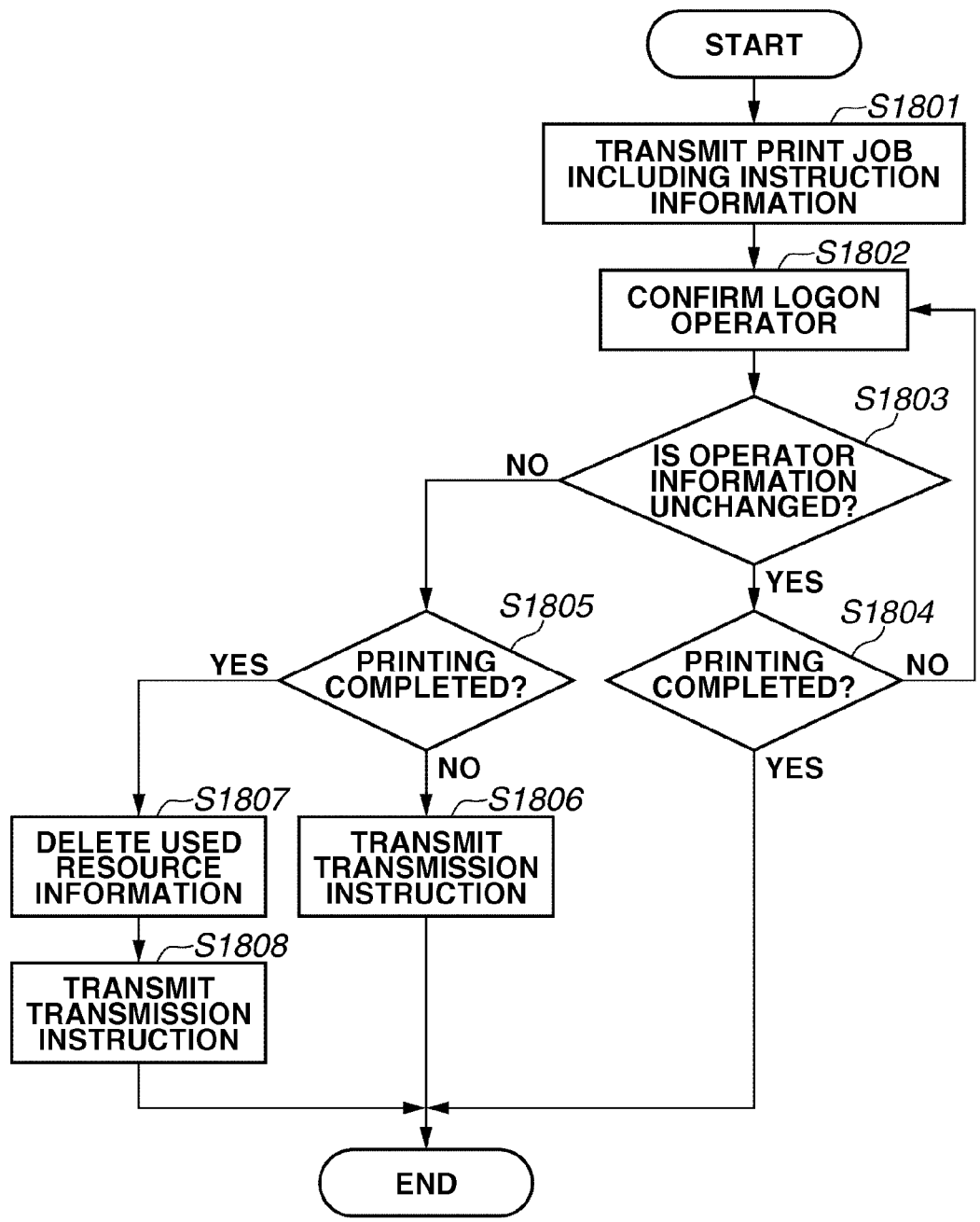
FIG. 18 is a flowchart illustrating an operation of the print job management application.

According to a second exemplary embodiment, the print job management application 203 executes the processing illustrated in FIG. 18 in order to solve this problem.

In step S1801, the print job management application 203 transmits the print job 208 including instruction information instructing to transmit the used resource information about the operator included in the logon notification.

In step S1802, the print job management application 203 checks the logon operator that is currently logged on to the digital MFP 104 at a predetermined interval.

In step S1803, the print job management application 203 determines whether the operator information transmitted in S1801 has changed. This can be determined by comparing the information about the current logon operator of the digital MFP 104 checked in step S1802 and the operator information transmitted in step S1801.

If the print job management application 203 determines that the information is unchanged (YES in step S1803), then the process proceeds to step S1804. In step S1804, the print job management application 203 determines whether the printing is completed.

The confirmation of whether the logon operator has changed is repeated until the printing is completed.

If the print job management application 203 determines that the information is changed (NO in step S1803), then the process proceeds to step S1805. In step S1805, the print job management application 203 determines whether the printing is completed. If the printing is not yet completed (NO in step S1805), the process proceeds to step S1806. In step S1806, the print job management application 203 transmits instruction information to the digital MFP 104 instructing the digital MFP 104 to transmit the used resource information about the new operator.

On the other hand, if the printing is completed (YES in step S1805), the process proceeds to step S1807. In step S1807, the print job management application 203 deletes the used resource information that includes the job ID of the print job transmitted in step S1801. In step S1808, the print job management application 203 transmits instruction information instructing the digital MFP 104 to transmit the used resource information in which information about the new operator is described in the job ID of the operator in charge.

According to the above-described processing, even if the logon operator when the logon notification is transmitted and the operator who actually processed the print job are different, accurate used resource information can be transmitted to the resource management application 201.

A third exemplary embodiment is different from the first exemplary embodiment in that the resource management application 201 designates the operator. The points different from the first exemplary embodiment will be described below. The present exemplary embodiment is described according to the sequence of the above-described FIG. 12B.

First, as illustrated in FIG. 5B, according to the setting of the user interface of the resource management application 201, the check box 507 is selected and thus the operator report is requested. Further, the radio button 508 is selected so as to select the operator. Further, for example, "Person A" is selected as the operator from a dialog 509 used for selecting user ID. Other settings are the same as those described in the first exemplary embodiment. Accordingly, "Person A" is designated as the operator and the logon management unit 608 of the digital MFP 104 inhibits logon of other operators.

According to the flowchart of the resource management application 201 illustrated in FIG. 14, in step S1401, under the control of the control unit 301, the job generation unit 302 generates a job to be transmitted to the prepress application 202. In the job ticket of the prepress job 205, as illustrated in FIG. 10A, "ID 1234" is set as the job ID, "arbitrary" is set in the storage field of the job owner, "None" is set for the operator report request, "2 in 1" is set for the imposition setting.

In step S1402, the prepress job 205 with the above-described settings is transmitted to the prepress application 202 via the communication unit 307. In step S1403, the prepress application 202 executes the prepress processing and transmits the prepress-completed job 206 to the resource management application 201 via the communication unit 307.

Then, the operator management unit 308 acquires the setting values illustrated in FIG. 5B. According to the present exemplary embodiment, as illustrated in FIG. 10C, "ID 1234" is set as the job ID, "Person A" is set as the job owner, and "Yes" is set for the operator report request. Additionally, the job editing unit 306 adds other setting values used at the time of printing such as the paper-feed stage setting and the finishing setting. In step S1405, the job editing unit 306 generates the print job 207 that reflects such setting values.

On the other hand, as illustrated in the flowchart in FIG. 15, under the control of the control unit 601, the print job management application 203 receives the print job 207 from the resource management application 201 via the first communication unit 602 and stores the print job in the received job storage unit 603. In step S1502, the job interpretation unit 604 interprets the print job 207.

In this case, since "Yes" is set for the operator report request in the job ticket of the print job 207, in step S1504, setting of the job owner 907 of the job ticket is confirmed. Since the job owner is "Person A" in this case, in steps S1508 and S1509, the print job management application 203 issues the print job 208 including "Person A" as the operator.

Then the processing proceeds to step S1314 in FIG. 13B, the communication unit 701 of the digital MFP 104 receives the print job 208 and the print processing is performed. In step S1315, the resource management unit 707 collects the resource information used in the print processing and, in step S1316, determines whether an owner is included in the job ticket. In this case, since the job owner of the job ticket is "Person A" as illustrated in FIG. 10C, in step S1318, the logon user management unit 706 determines that "Person A" is the job owner (operator).

In step S1319, the resource management unit 707 generates the resource log, and stores the generated log to the resource log database 709. The resource log will be as illustrated in FIG. 17A and, in step S1320, the communication unit 701 transmits the resource information to the print job management application 203 as the used resource information.

Returning to FIG. 15, in step S1510, the second communication unit 609 of the print job management application 203 acquires the used resource information and, in step S1511, transmits the information to the resource management application 201. Then the processing proceeds to step S1407 in FIG. 14, the resource management unit 304 of the resource management application 201 receives the used resource information and, in step S1408, stores the used resource information to the used resource database 204.

According to the present invention, whether an operator has completed operation preparation is determined from a logon state of the digital printing apparatus, and start of a print job is scheduled accordingly. Thus, an operation result of a printing operation performed by the operator and records of consumables and error states can be collected based on the output data of the digital printing apparatus. Further, even if an operator is determined by an upper management unit, result management of the operator can be performed by obtaining operation history of the job performed by the determined operator.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-011320 filed Jan. 21, 2009, which is hereby incorporated by reference herein in its entirety.

What is claimed is:

1. A print job management apparatus which generates a print job to be transmitted to a printing apparatus, the print job management apparatus comprising:
   a job interpretation unit configured to determine whether or not an operator processing the print job is designated;
   a logon management unit configured to confirm whether or not an operator logging on to the printing apparatus exists if the job interpretation unit determines that the operator is not designated;
   a job generation unit configured to generate the print job including a transmission instruction to transmit information about used resource;
   a transmission control unit configured to wait to transmit the print job if the logon management unit determines that no operator is logging on to the printing apparatus and to transmit the print job to the printing apparatus if the logon management unit determines that an operator is logging on to the printing apparatus;
   wherein the transmission control unit is further configured to transmit the print job including the transmission instruction and the designation of the operator to the printing apparatus without using a result of the confirmation by the logon management unit if the job interpretation unit determines that the operator is designated.

2. The print job management apparatus according to claim 1, further comprising a determination unit configured to determine whether or not the operator logging on to the printing apparatus is changed during a period between a time when the transmission control unit transmits the print job and a time when the print processing is complete, wherein the transmission control unit transmits a transmission instruction to transmit new information about used resource to the printing apparatus when the operator logging on is determined to have been changed.

3. A control method executed by a print job management apparatus which generates a print job to be transmitted to a printing apparatus, the method comprising:
   determining whether or not an operator processing the print job is designated;
   confirming whether or not an operator logging on to the printing apparatus exists if the operator is not determined as designated;
   generating the print job including a transmission instruction to transmit information about used resource;
   waiting to transmit the print job if it is determined that no operator is logging on to printing apparatus, and transmitting the print job to the printing apparatus if it is determined that an operator is logging on to the printing apparatus; and
   transmitting the print job including the transmission instruction and the designation of the operator to the printing apparatus if the operator is designated in the determining step regardless whether or not an operator logging on to the printing apparatus exists.

4. The control method according to claim 3, further comprising determining whether or not the operator logging on to the printing apparatus is changed during a period between a time to transmit the print job and a time when the print processing is complete, wherein the transmitting step further transmits a transmission instruction to transmit new information about used resource to the printing apparatus when the operator logging on is determined to have been changed.

5. A non-transitory computer-readable storage medium storing instructions to be executed by a print job management apparatus which generates a print job to be transmitted to a printing apparatus, the instructions comprising:
   determining whether or not an operator processing the print job is designated;
   confirming whether or not an operator logging on to the printing apparatus exists if the operator is not determined as designated;
   generating the print job including a transmission instruction to transmit information about used resource;
   waiting to transmit the print job if it is determined that no operator is logging on to printing apparatus, and transmitting the print job to the printing apparatus if it is determined that an operator is logging on to the printing apparatus; and
   transmitting the print job including the transmission instruction and the designation of the operator to the printing apparatus if the operator is designated in the determining step regardless whether or not an operator logging on to the printing apparatus exists.

6. The non-transitory computer-readable storage medium according to claim 5, wherein the storing instructions further comprises determining whether or not the operator logging on to the printing apparatus is changed during a period between a time to transmit the print job and a time when the print processing is complete, wherein the transmitting step further transmits a transmission instruction to transmit new information about used resource to the printing apparatus when the operator logging on is determined to have been changed.

* * * * *